United States Patent
Barton et al.

(10) Patent No.: US 10,294,920 B2
(45) Date of Patent: May 21, 2019

(54) WIND TURBINE AND METHOD FOR OPERATING A WIND TURBINE

(71) Applicant: General Electric Company, Schenectady, NY (US)

(72) Inventors: Werner Gerhard Barton, Gescher (DE); Hartmut Scholte-Wassink, Lage (DE); Christoph Wolters, Dülmen (DE)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 807 days.

(21) Appl. No.: 14/862,385

(22) Filed: Sep. 23, 2015

(65) Prior Publication Data
US 2017/0082090 A1   Mar. 23, 2017

(51) Int. Cl.
| | | |
|---|---|---|
| *F03D 7/02* | (2006.01) | |
| *F03D 7/04* | (2006.01) | |
| *H02K 7/18* | (2006.01) | |
| *H02P 9/00* | (2006.01) | |
| *H02P 9/04* | (2006.01) | |

(52) U.S. Cl.
CPC ........ *F03D 7/0224* (2013.01); *F03D 7/028* (2013.01); *F03D 7/042* (2013.01); *H02K 7/183* (2013.01); *H02P 9/008* (2013.01); *H02P 9/04* (2013.01); *Y02E 10/721* (2013.01); *Y02E 10/723* (2013.01); *Y02E 10/725* (2013.01)

(58) Field of Classification Search
CPC .................................................. F03D 7/0224
See application file for complete search history.

(56) References Cited

U.S. PATENT DOCUMENTS

| | | | | |
|---|---|---|---|---|
| 4,366,387 A | * | 12/1982 | Carter, Jr. ............. | F03D 1/0608 290/55 |
| 2003/0185665 A1 | * | 10/2003 | Hansen ................. | F03D 7/0224 415/1 |
| 2007/0205602 A1 | * | 9/2007 | Willey ................. | F03D 7/0224 290/44 |
| 2010/0286835 A1 | * | 11/2010 | Nyborg ................ | F03D 7/0224 700/287 |
| 2012/0128488 A1 | * | 5/2012 | Kristoffersen ........ | F03D 7/0224 416/31 |
| 2013/0161955 A1 | * | 6/2013 | Dalsgaard ............. | F03D 7/0224 290/44 |

(Continued)

*Primary Examiner* — Woody A Lee, Jr.
(74) *Attorney, Agent, or Firm* — GE Global Patent Operation; Douglas D. Zhang

(57) ABSTRACT

A method for operating a turbine having a rotor including a hub and at least one blade rotatably arranged around its longitudinal axis at the hub, an induction generator having a stator and rotor coupled to the turbine shaft, a pitch drive system having an actuator, a control system, and a measuring device. The method includes: measuring the operational value of a component of the pitch drive system and adjusting the angle to the target pitch angle, wherein the wind turbine is operated according to at least two operational modes. During a first mode, a first target pitch angle is determined at least according to a power curve of the wind turbine or measured wind speed. During a second mode, a second target pitch angle is determined by adding a pitch offset to the first target pitch and is activated when the measured operational value exceeds a predefined activation threshold.

14 Claims, 5 Drawing Sheets

| Activation temperature threshold [C°] | 40 | 42 | 44 | 46 | 48 |
|---|---|---|---|---|---|
| Deactivation temperature threshold [C°] | 39 | 41 | 43 | 45 | 47 |
| Pitch-Offset [°] | 0.05 | 0.1 | 0.15 | 0.5 | 1 |

(56) References Cited

U.S. PATENT DOCUMENTS

| | | | |
|---|---|---|---|
| 2014/0028025 A1* | 1/2014 | Ibendorf | F03D 7/0224 290/44 |
| 2015/0354532 A1* | 12/2015 | Nielsen | F03D 7/0224 416/9 |

* cited by examiner

| Activation temperature threshold [C°] | 40 | 42 | 44 | 46 | 48 |
|---|---|---|---|---|---|
| Deactivation temperature threshold [C°] | 39 | 41 | 43 | 45 | 47 |
| Pitch-Offset [°] | 0.05 | 0.1 | 0.15 | 0.5 | 1 |

WIND TURBINE AND METHOD FOR OPERATING A WIND TURBINE

BACKGROUND OF THE INVENTION

The subject matter described herein relates generally to methods and systems for operating wind turbines, and more particularly, to methods and systems for controlling a pitch system of a blade of a wind turbine.

Generally, a wind turbine includes a turbine that has a rotor that includes a rotatable hub assembly having multiple blades. The blades transform wind energy into a mechanical rotational torque that drives one or more generators via the rotor. The generators are sometimes, but not always, rotationally coupled to the rotor through a gearbox. The gearbox steps up the inherently low rotational speed of the rotor for the generator to efficiently convert the rotational mechanical energy to electrical energy, which is fed into a utility grid via at least one electrical connection. Gearless direct drive wind turbines also exist. The rotor, generator, gearbox and other components are typically mounted within a housing, or nacelle, that is positioned on top of a base that may be a truss or tubular tower.

Some wind turbine configurations include double-fed induction generators (DFIGs). Such configurations may also include power converters that are used to convert a frequency of generated electric power to a frequency substantially similar to a utility grid frequency. Moreover, such converters, in conjunction with the DFIG, also transmit electric power between the utility grid and the generator as well as transmit generator excitation power to a wound generator rotor from one of the connections to the electric utility grid connection. Alternatively, some wind turbine configurations include, but are not limited to, alternative types of induction generators, permanent magnet (PM) synchronous generators and electrically-excited synchronous generators and switched reluctance generators. These alternative configurations may also include power converters that are used to convert the frequencies as described above and transmit electrical power between the utility grid and the generator.

Known wind turbines have a plurality of mechanical and electrical components. Each electrical and/or mechanical component may have independent or different operating limitations, such as current, voltage, power, and/or temperature limits, than other components. Moreover, known wind turbines typically are designed and/or assembled with predefined rated power limits. To operate within such rated power limits, the electrical and/or mechanical components may be operated with large margins for the operating limitations. Such operation may result in inefficient wind turbine operation, and a power generation capability of the wind turbine may be underutilized.

BRIEF DESCRIPTION OF THE INVENTION

In one aspect, a method for operating a wind turbine is provided comprising the steps as described below. The wind turbine has a turbine rotor including a hub and at least one blade mounted to a rotatable turbine shaft, wherein the blade is rotatably arranged around its longitudinal axis at the hub, an induction generator having a stator and a rotor coupled to the turbine shaft for rotation therewith, a pitch drive system having an actuator for adjusting a pitch angle of the blade, a control system for defining a target pitch angle and for continuously controlling the actuator accordingly, and a measuring device for measuring at least one operational value of a component the pitch drive. In a first step the operational value of a component of the pitch drive system is measured and the pitch angle is adjusted according to the target pitch angle. The wind turbine is operated according to at least two operational modes, wherein during a first operational mode a first target pitch angle is determined at least according to a power curve of the wind turbine or according to a measured wind speed, wherein during a second operational mode a second target pitch angle is determined by adding an pitch offset to the first target pitch angle, and wherein the second operational mode is activated if the measured operational value exceeds a predefined activation threshold.

According to the upper aspect the pitch offset is 0.05°, 0.1°, preferably 0.15°, additionally and/or alternatively 0.5° or 1° arc degree.

Additionally and/or alternatively the value of the pitch offset in increasing with an increasing with an increasing measured operational value of the component the pitch drive. Typically, the pitch offset initially comes to 0.05°, followed by 0.1°, then 0.15°, 0.5° and 1°.

In another aspect, a wind turbine is disclosed having a turbine rotor including a hub and at least one blade mounted to a rotatable turbine shaft, wherein the blade is rotatably arranged around its longitudinal axis at the hub, an induction generator having a stator and a rotor coupled to the turbine shaft for rotation therewith, a pitch drive system having an actuator for adjusting a pitch angle of the blade, a control system for defining a target pitch angle and for continuously controlling the actuator accordingly, and a measuring device for measuring at least one operational value of a component of the pitch drive system. In this context, the control system is configured such to operate the wind turbine according to at least two operational modes: during a first operational mode a first target pitch angle is determined at least according to a power curve of the wind turbine or to a measured wind speed. During a second operational mode a second target pitch angle is determined by adding a pitch offset to the first target pitch angle, wherein the second operational mode is activated if the measured operational value exceeds a predefined activation threshold.

In yet a third aspect, a further method for controlling a wind turbine is provided, wherein the wind turbine comprises a turbine rotor including a hub and at least one blade mounted to a rotatable turbine shaft, wherein the blade is rotatably arranged around its longitudinal axis at the hub, an induction generator having a stator and a rotor coupled to the turbine shaft for rotation therewith, a pitch drive system having an actuator for adjusting a pitch angle of the blade, a control system for defining a target pitch angle and for continuously controlling the actuator accordingly, and a measuring device for measuring at least one operational value of a component the pitch drive. The method comprises the following steps: providing a wind turbine having a turbine rotor including a hub and at least one blade mounted to a rotatable turbine shaft, wherein the blade is rotatably arranged around its longitudinal axis at the hub, an induction generator having a stator and a rotor coupled to the turbine shaft for rotation therewith, a pitch drive system having an actuator for adjusting a pitch angle of the blade, a control system for defining a target pitch angle and for continuously controlling the actuator accordingly, and a measuring device for measuring at least one operational value of a component of the pitch drive system. In the second step the operational value of a component of the pitch drive system is measured; wherein in a third step and the pitch angle is adjusted according to the target pitch angle, wherein the wind turbine being operated according to at least two operational modes, wherein during a first operational mode a first target pitch angle is determined at least according to a power curve of the wind turbine or according to a measured wind speed, wherein during a second operational mode a second target pitch angle is determined by adding a predefined deviation factor to the definition process of the first target pitch angle, and wherein the second operational mode is activated if the measured operational value exceeds a predefined activation threshold.

According to an embodiment of the third aspect, the measuring device is embodied as temperature sensor for measuring a temperature of the actuator of the pitch drive system, the operational value is the temperature of the actuator of the pitch drive system, and the activation threshold is an activation temperature threshold. Preferably, the activation temperature threshold exceeds a predefined maximum temperature by 10%, preferably by 5%, more preferably by 2.5%, and most preferably by 1%.

According to a further embodiment of the third aspect, a plurality of activation thresholds and corresponding deviation values are retrieved from a Look-Up-Table (LUT), wherein the amount of each deviation value increases with the increase of the related activation thresholds.

According to a further embodiment of the third aspect, the control system is provided with an algorithm for calculating a deviation value corresponding to the measured operational value temperature.

According to an additional embodiment of the third aspect, during the second operational mode a current deviation value is cleared and replaced by a lower deviation value when the measured operational value is below a clearing threshold corresponding to the current deviation value, which is lower than the corresponding activation threshold.

According to an additional embodiment of the third aspect, the wind turbine is operated in the second operational mode only if an electrical output of the wind turbine exceeds 50% of its nominal electrical output power.

Furthermore, the method for operating a wind turbine according to the third aspect comprises during the second operational mode the step of increasing or reducing an electrical load of the induction generator and thereby increasing or reducing generator's momentum being effective on the turbine rotor. By applying such measure a variation of the rotational speed of the rotor can be reduced, which may be caused by wind gusts during the wind turbine operating in the second mode.

According to another embodiment of the third aspect, the second target pitch angle is applied to each blade in case the wind turbine rotor comprises more than one blade.

According to a further aspect of the invention, a wind turbine is disclosed, which has a turbine rotor including a hub and at least one blade mounted to a rotatable turbine shaft, wherein the blade is rotatably arranged around its longitudinal axis at the hub, an induction generator having a stator and a rotor coupled to the turbine shaft for rotation therewith, a pitch drive system having an actuator for adjusting a pitch angle of the blade, a control system for defining a target pitch angle and for continuously controlling the actuator accordingly, and a measuring device for measuring at least one operational value of a component of the pitch drive system. The control system is configured such to operate the wind turbine according to at least two operational modes: during a first operational mode a first target pitch angle is determined at least according to a power curve of the wind turbine or to a measured wind speed; during a second operational mode a second target pitch angle is determined by adding a predefined deviation factor to the definition process of the first target pitch angle, wherein the second operational mode is activated if the measured operational value exceeds a predefined activation threshold.

With respect to previously mentioned aspects and embodiments of the invention, corresponding teaching can be combined at least partially in order to obtain synergetic effects. I.e. is may be promising to combine a pitch offset with the deviation factor when operating the wind turbine in the second operational mode.

Further aspects, advantages and features of the present invention are apparent from the dependent claims, the description and the accompanying drawings.

BRIEF DESCRIPTION OF THE DRAWINGS

A full and enabling disclosure including the best mode thereof, to one of ordinary skill in the art, is set forth more particularly in the remainder of the specification, including reference to the accompanying figures wherein.

DETAILED DESCRIPTION OF THE INVENTION

Figure 1:
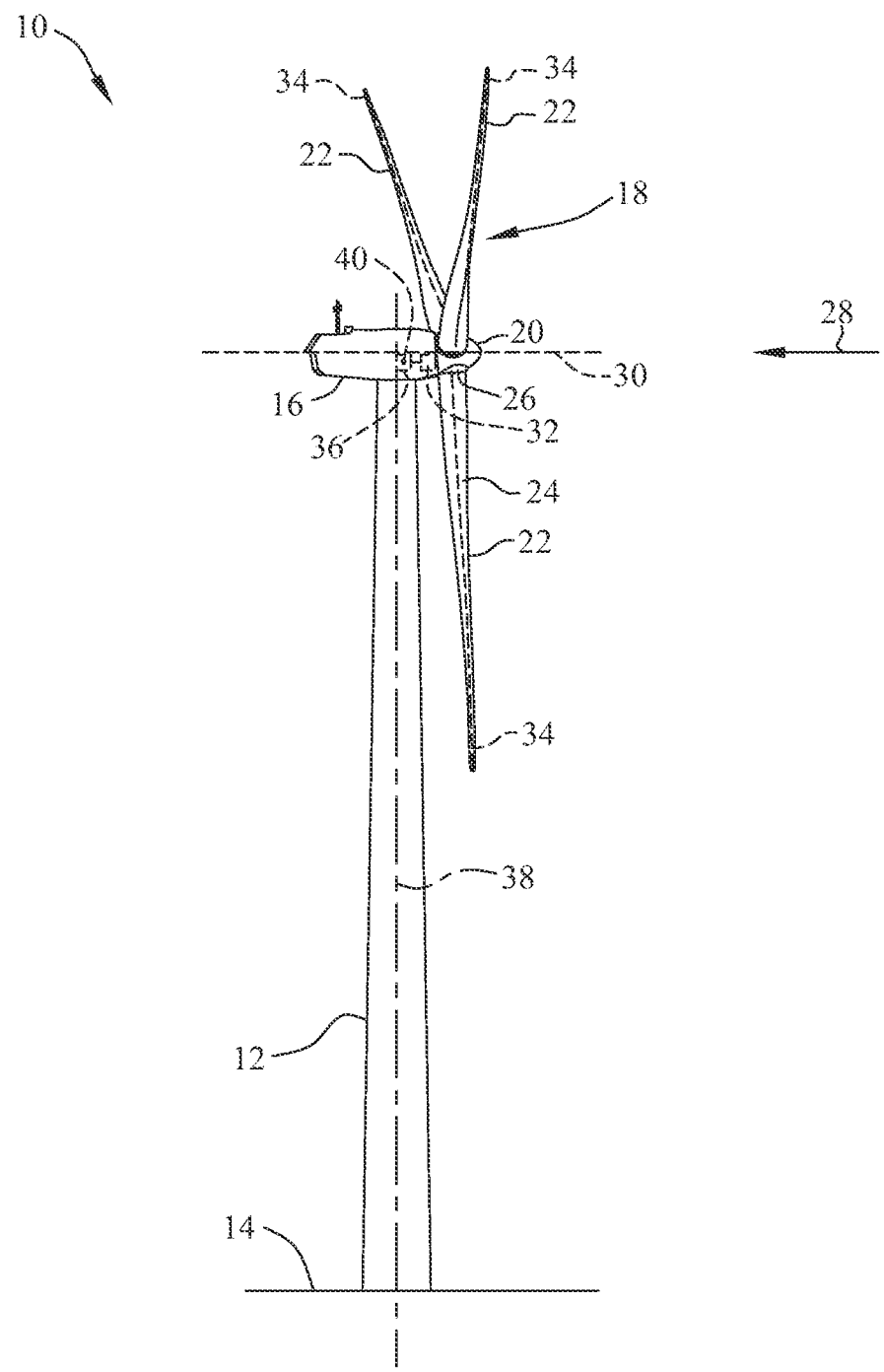
FIG. 1 is a perspective view of a portion of an exemplary wind turbine.

Reference will now be made in detail to the various embodiments, one or more examples of which are illustrated in each figure. Each example is provided by way of explanation and is not meant as a limitation. For example, features illustrated or described as part of one embodiment can be used on or in conjunction with other embodiments to yield yet further embodiments. It is intended that the present disclosure includes such modifications and variations.

The embodiments described herein include a method for a wind turbine system wherein an operational value of a component of the pitch drive system is monitored. In case the measured operational value exceeds a predetermined activation threshold, the control system of the wind turbine applies countermeasures in order to protect said component and/or further components of the pitch drive system. Such countermeasures are implemented by switching from a first operational mode to a second operational mode.

According to an embodiment, a pitch offset is added to a first target pitch angle and thereby determining a second target pitch angle. By this, the efficiency of harvesting kinetic energy from the wind is reduced. This is especially effective, if due to high wind speed the wind turbine would be operated at rated power without any general modification as it is in the first operational mode. In this case, the control system of the pitch drive system would constantly modify the pitch angle for preventing the wind turbine being operated above technological limits during wind gusts. This again leads to the effect that the actuator of the pitch drive system is constantly active since fluctuations in wind speed would need to be compensated constantly.

By introducing a general pitch offset in the second operational mode the wind turbine reaches rated power at higher wind speeds than in the first operational mode, dependent on the amount of the offset. Subsequently, the control system of the pitch drive system is not required to actively and constantly adjust the pitch angle in relation to wind gusts which enables the wind turbine to be operated at variable speed of the rotor. By this, operating time of the pitch drive system and components thereof is reduced drastically, which results in an enhanced lifetime of such components. This may come with an additional effect of a reduced production of electrical energy.

According to a further or alternative embodiment a predefined deviation factor is added to the definition process of the first target pitch angle and thereby determining a second target pitch angle. Such deviation factor can be embodied as a coarsening value for coarsening qualitative reaction characteristics of the pitch drive system. In detail, during second operational mode, the control system of the wind turbine or of the pitch drive system was determining a pitch angle difference between the first target pitch angle and a current pitch angle of the blade, and subsequently equating the second target pitch angle with the first target pitch angle, only if an absolute value of pitch angle difference is larger than the coarsening value. As result, the pitch drive system, respectively the control system, would not implement every little change request for the pitch angle. Only if relatively large changes of the pitch angle—at least larger than the coarsening value which is provided in degrees—are required, those would be realized. This results in a remarkably reduced activity of the pitch drive system and therefore in a reduced wear and enhanced lifetime of the pitch drive system and components thereof.

Additionally and/or alternatively, the deviation factor can be embodied as a predefined delay time which is applied to the process of determining the second target pitch angle during the second operational mode. In other words, a timely buffer is applied when the second target pitch angle is determined. This has the effect, that changes of the pitch angle are implemented only after a certain delay period has passed since the last activation of the pitch drive system. This is well leads to a reduction of operating time of the pitch drive system and components thereof, which again results in an enhanced lifespan of such components.

Both embodiments of the application of a predefined deviation factor to the process of determining the second target pitch angle could come with the effect of a reduced responsiveness of the pitch drive system to changes in wind speed. This again is resulting in an increased fluctuation of the production of electrical energy.

As used herein, the term "target pitch angle" is intended to be representative of a desired angular position of the blade in respect to the axis of the rotor of the wind turbine. Said target pitch angle is determined by the control system of the wind turbine or of the pitch drive system with respect to a wind speed, the power curve, further environmental and/or operational characteristics of the wind turbine, for example the load caused by the induction generator applied on the drive train of the wind turbine. With the help of the pitch drive system said target pitch angle is implemented by rotating the blade around its longitudinal axis such, that its angular position corresponds with the target pitch angle.

As used herein, the term "blade" is intended to be representative of any device that provides a reactive force when in motion relative to a surrounding fluid. As used herein, the term "wind turbine" is intended to be representative of any device that generates rotational energy from wind energy, and more specifically, converts kinetic energy of wind into mechanical energy. As used herein, the term "wind generator" is intended to be representative of any wind turbine that generates electrical power from rotational energy generated from wind energy, and more specifically, converts mechanical energy converted from kinetic energy of wind to electrical power.

FIG. 1 is a perspective view of an exemplary wind turbine 10. In the exemplary embodiment, wind turbine 10 is a horizontal-axis wind turbine. Alternatively, wind turbine 10 may be a vertical-axis wind turbine. In the exemplary embodiment, wind turbine 10 includes a tower 12 that extends from a support system 14, a nacelle 16 mounted on tower 12, and a rotor 18 that is coupled to nacelle 16. Rotor 18 includes a rotatable hub 20 and at least one rotor blade 22 coupled to and extending outward from hub 20. In the exemplary embodiment, rotor 18 has three rotor blades 22. In an alternative embodiment, rotor 18 includes more or less than three rotor blades 22. In the exemplary embodiment, tower 12 is fabricated from tubular steel to define a cavity (not shown in FIG. 1) between support system 14 and nacelle 16. In an alternative embodiment, tower 12 is any suitable type of tower having any suitable height.

Rotor blades 22 are spaced about hub 20 to facilitate rotating rotor 18 to enable kinetic energy to be transferred from the wind into usable mechanical energy, and subsequently, electrical energy. Rotor blades 22 are mated to hub 20 by coupling a blade root portion 24 to hub 20 at a plurality of load transfer regions 26. Load transfer regions 26 have a hub load transfer region and a blade load transfer region (both not shown in FIG. 1). Loads induced to rotor blades 22 are transferred to hub 20 via load transfer regions 26.

In one embodiment, rotor blades 22 have a length ranging from about 15 meters (m) to about 91 m. Alternatively, rotor blades 22 may have any suitable length that enables wind turbine 10 to function as described herein. For example, other non-limiting examples of blade lengths include 10 m or less, 20 m, 37 m, or a length that is greater than 91 m. As wind strikes rotor blades 22 from a direction 28, rotor 18 is rotated about an axis of rotation 30. As rotor blades 22 are rotated and subjected to centrifugal forces, rotor blades 22 are also subjected to various forces and moments. As such, rotor blades 22 may deflect and/or rotate from a neutral, or non-deflected, position to a deflected position.

Moreover, a pitch angle of rotor blades 22, i.e., an angle that determines a perspective of rotor blades 22 with respect to direction 28 of the wind, may be changed by a pitch drive system 68 to control the load and power generated by wind turbine 10 by adjusting an angular position of at least one rotor blade 22 relative to wind vectors. Pitch axes 34 for rotor blades 22 are shown. During operation of wind turbine 10, pitch drive system 68 may change a pitch angle of rotor blades 22 such that rotor blades 22 are moved to a feathered position, such that the perspective of at least one rotor blade 22 relative to wind vectors provides a minimal surface area of rotor blade 22 to be oriented towards the wind vectors, which facilitates reducing a rotational speed of rotor 18 and/or facilitates a stall of rotor 18.

In the exemplary embodiment, a pitch angle of each rotor blade 22 is controlled individually by a control system 36. Alternatively, the pitch angle for all rotor blades 22 may be controlled simultaneously by control system 36. Further, in the exemplary embodiment, as direction 28 changes, a yaw direction of nacelle 16 may be controlled about a yaw axis 38 to position rotor blades 22 with respect to direction 28.

In the exemplary embodiment, control system 36 is shown as being centralized within nacelle 16; however, control system 36 may be a distributed system throughout wind turbine 10, on support system 14, within a wind farm, and/or at a remote control center. Control system 36 includes a processor 40 configured to perform the methods and/or steps described herein. Further, many of the other components described herein include a processor. As used herein, the term "processor" is not limited to integrated circuits referred to in the art as a computer, but broadly refers to a control system, a microcontroller, a microcomputer, a programmable logic controller (PLC), an application specific integrated circuit, and other programmable circuits, and these terms are used interchangeably herein. It should be understood that a processor and/or a control system can also include memory, input channels, and/or output channels.

In the embodiments described herein, memory may include, without limitation, a computer-readable medium, such as a random access memory (RAM), and a computer-readable non-volatile medium, such as flash memory. Alternatively, a floppy disk, a compact disc-read only memory (CD-ROM), a magneto-optical disk (MOD), and/or a digital versatile disc (DVD) may also be used. Also, in the embodiments described herein, input channels include, without limitation, sensors and/or computer peripherals associated with an operator interface, such as a mouse and a keyboard. Further, in the exemplary embodiment, output channels may include, without limitation, a control device, an operator interface monitor and/or a display.

Processors described herein process information transmitted from a plurality of electrical and electronic devices that may include, without limitation, sensors, actuators, compressors, control systems, and/or monitoring devices. Such processors may be physically located in, for example, a control system, a sensor, a monitoring device, a desktop computer, a laptop computer, a programmable logic controller (PLC) cabinet, and/or a distributed control system (DCS) cabinet. RAM and storage devices store and transfer information and instructions to be executed by the processor(s). RAM and storage devices can also be used to store and provide temporary variables, static (i.e., non-changing) information and instructions, or other intermediate information to the processors during execution of instructions by the processor(s). Instructions that are executed may include, without limitation, wind turbine control system control commands. The execution of sequences of instructions is not limited to any specific combination of hardware circuitry and software instructions.

Figure 2:
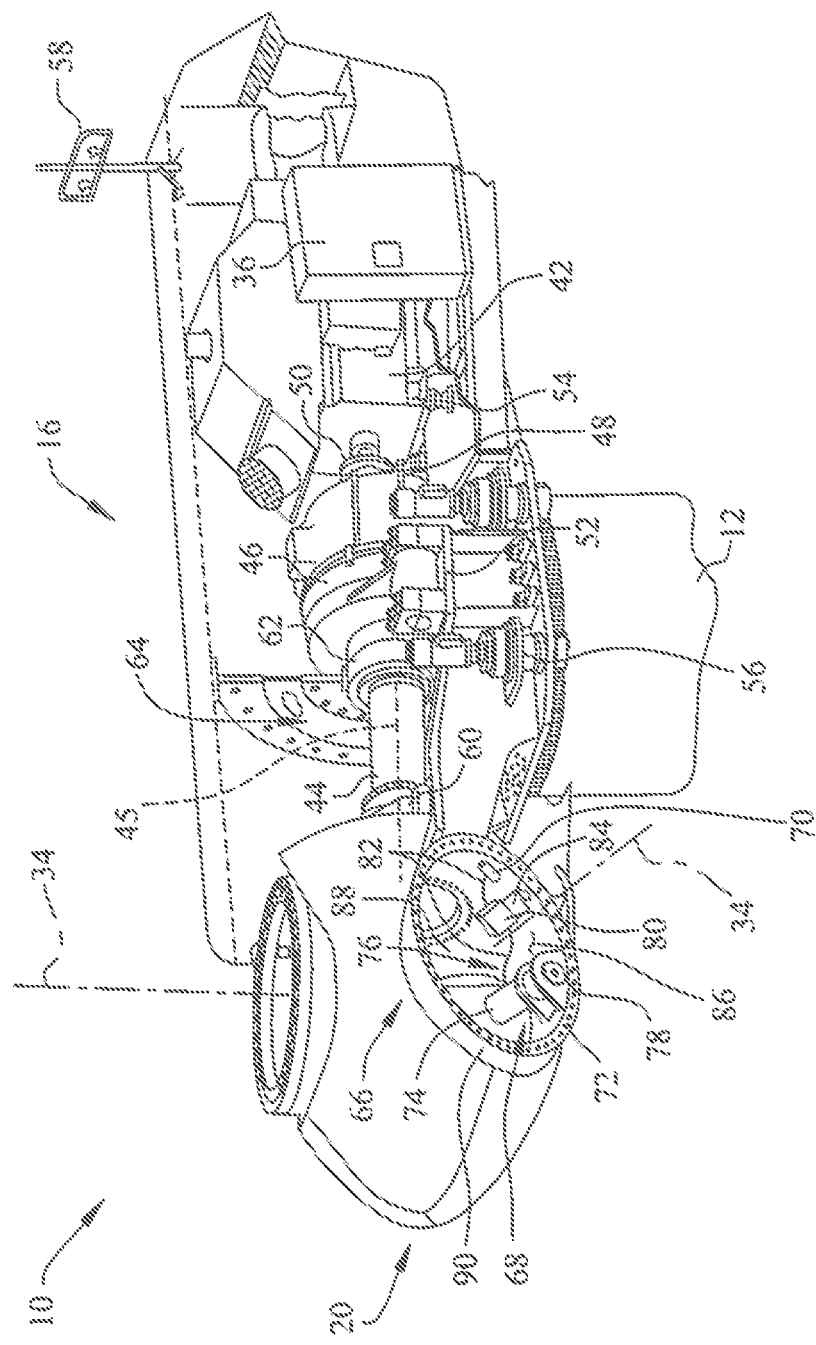
FIG. 2 is a schematic view of an exemplary electrical and control system suitable for use with the wind turbine shown in FIG. 1.

FIG. 2 is an enlarged sectional view of a portion of wind turbine 10. In the exemplary embodiment, wind turbine 10 includes nacelle 16 and hub 20 that is rotatably coupled to nacelle 16. More specifically, hub 20 is rotatably coupled to an induction generator 42 positioned within nacelle 16 by rotor shaft 44 (sometimes referred to as either a main shaft or a low speed shaft), a gearbox 46, a high speed shaft 48, and a coupling 50. In the exemplary embodiment, rotor shaft 44 is disposed coaxial to longitudinal axis 45. Rotation of rotor shaft 44 rotatably drives gearbox 46 that subsequently drives high speed shaft 48. High speed shaft 48 rotatably drives generator 42 with coupling 50 and rotation of high speed shaft 48 facilitates production of electrical power by generator 42. Gearbox 46 and generator 42 are supported by a support 52 and a support 54. In the exemplary embodiment, gearbox 46 utilizes a dual path geometry to drive high speed shaft 48. Alternatively, rotor shaft 44 is coupled directly to generator 42 with coupling 50.

Nacelle 16 also includes a yaw drive mechanism 56 that may be used to rotate nacelle 16 and hub 20 on yaw axis 38 (shown in FIG. 1) to control the perspective of rotor blades 22 with respect to direction 28 of the wind. Nacelle 16 also includes at least one meteorological mast 58 that includes a wind vane and anemometer (neither shown in FIG. 2). Mast 58 provides information to control system 36 that may include wind direction and/or wind speed. In the exemplary embodiment, nacelle 16 also includes a main forward support bearing 60 and a main aft support bearing 62.

Forward support bearing 60 and aft support bearing 62 facilitate radial support and alignment of rotor shaft 44. Forward support bearing 60 is coupled to rotor shaft 44 near hub 20. Aft support bearing 62 is positioned on rotor shaft 44 near gearbox 46 and/or generator 42. Alternatively, nacelle 16 includes any number of support bearings that enable wind turbine 10 to function as disclosed herein. Rotor shaft 44, generator 42, gearbox 46, high speed shaft 48, coupling 50, and any associated fastening, support, and/or securing device including, but not limited to, support 52 and/or support 54, and forward support bearing 60 and aft support bearing 62, are sometimes referred to as a drive train 64.

In the exemplary embodiment, hub 20 includes a pitch assembly 66. Pitch assembly 66 includes one or more pitch drive systems 68 and at least one sensor 70. Each pitch drive system 68 is coupled to a respective rotor blade 22 (shown in FIG. 1) for modulating the pitch angle of associated rotor blade 22 along pitch axis 34. Only one of three pitch drive systems 68 is shown in FIG. 2.

In the exemplary embodiment, pitch assembly 66 includes at least one pitch bearing 72 coupled to hub 20 and to respective rotor blade 22 (shown in FIG. 1) for rotating respective rotor blade 22 about pitch axis 34. Pitch drive system 68 includes an actuator embodied as pitch drive motor 74, pitch drive gearbox 76, and pitch drive pinion 78. Pitch drive motor 74 is coupled to pitch drive gearbox 76 such that pitch drive motor 74 imparts mechanical force to pitch drive gearbox 76. Pitch drive gearbox 76 is coupled to pitch drive pinion 78 such that pitch drive pinion 78 is rotated by pitch drive gearbox 76. Pitch bearing 72 is coupled to pitch drive pinion 78 such that the rotation of pitch drive pinion 78 causes rotation of pitch bearing 72. More specifically, in the exemplary embodiment, pitch drive pinion 78 is coupled to pitch bearing 72 such that rotation of pitch drive gearbox 76 rotates pitch bearing 72 and rotor blade 22 about pitch axis 34 to change the pitch angle of blade 22.

Pitch drive system 68 is coupled to control system 36 for adjusting the pitch angle of rotor blade 22 upon receipt of one or more signals from control system 36. In the exemplary embodiment, actuator is any suitable motor driven by electrical power and/or a hydraulic system that enables pitch assembly 66 to function as described herein. Alternatively, pitch assembly 66 may include any suitable structure, configuration, arrangement, and/or components such as, but not limited to, hydraulic cylinders, springs, and/or servo-mechanisms. Moreover, pitch assembly 66 may be driven by any suitable means such as, but not limited to, hydraulic fluid, and/or mechanical power, such as, but not limited to, induced spring forces and/or electromagnetic forces. In certain embodiments, pitch drive motor 74 is driven by energy extracted from a rotational inertia of hub 20 and/or a stored energy source (not shown) that supplies energy to components of wind turbine 10.

Pitch assembly 66 also includes one or more overspeed control systems 80 for controlling pitch drive system 68 during rotor overspeed. In the exemplary embodiment, pitch assembly 66 includes at least one overspeed control system 80 communicatively coupled to respective pitch drive system 68 for controlling pitch drive system 68 independently of control system 36. In one embodiment, pitch assembly 66 includes a plurality of overspeed control systems 80 that are each communicatively coupled to respective pitch drive system 68 to operate respective pitch drive system 68 independently of control system 36. Overspeed control system 80 is also communicatively coupled to sensor 70. In the exemplary embodiment, overspeed control system 80 is coupled to pitch drive system 68 and to sensor 70 with a plurality of cables 82. Alternatively, overspeed control system 80 is communicatively coupled to pitch drive system 68 and to sensor 70 using any suitable wired and/or wireless communications device. During normal operation of wind turbine 10, control system 36 controls pitch drive system 68 to adjust a pitch of rotor blade 22. In one embodiment, when rotor 18 operates at rotor overspeed, overspeed control system 80 overrides control system 36, such that control system 36 no longer controls pitch drive system 68 and overspeed control system 80 controls pitch drive system 68 to move rotor blade 22 to a feathered position to slow a rotation of rotor 18.

A power generator 84 is coupled to sensor 70, overspeed control system 80, and pitch drive system 68 to provide a source of power to pitch assembly 66. In the exemplary embodiment, power generator 84 provides a continuing source of power to pitch assembly 66 during operation of wind turbine 10. In an alternative embodiment, power generator 84 provides power to pitch assembly 66 during an electrical power loss event of wind turbine 10. The electrical power loss event may include power grid loss, malfunctioning of the turbine electrical system, and/or failure of the wind turbine control system 36. During the electrical power loss event, power generator 84 operates to provide electrical power to pitch assembly 66 such that pitch assembly 66 can operate during the electrical power loss event.

In the exemplary embodiment, pitch drive system 68, sensor 70, overspeed control system 80, cables 82, and power generator 84 are each positioned in a cavity 86 defined by an inner surface 88 of hub 20. In a particular embodiment, pitch drive system 68, sensor 70, overspeed control system 80, cables 82, and/or power generator 84 are coupled, directly or indirectly, to inner surface 88. In an alternative embodiment, pitch drive system 68, sensor 70, overspeed control system 80, cables 82, and power generator 84 are positioned with respect to an outer surface 90 of hub 20 and may be coupled, directly or indirectly, to outer surface 90.

According to an embodiment, pitch drive system 68 is equipped with a measuring device for measuring a temperature of the component, and especially of an actuator of pitch drive system 68.

Figure 3:
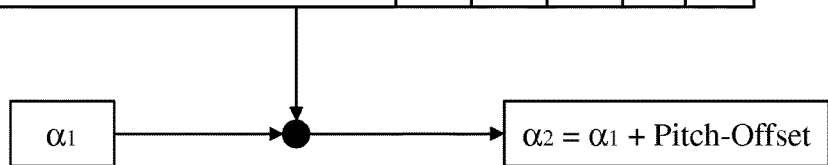
FIG. 3 represents the concept of adding a pitch offset to the first target pitch angle during operating the wind turbine in the second operational mode.

In an exemplary embodiment, the method for operating wind turbine 10 is schematically described in FIG. 3. In detail, it is explained how control system 36 of wind turbine 10 adjusts first target pitch angle α1 by adding a pitch offset and thereby determining α2 when operating wind turbine 10 in the second operational mode. According to this embodiment wind turbine 10 is operated in a first, normal mode, if a measured temperature of a component of pitch drive system 68, for example the motor, is below and activation temperature threshold of 40° C. In said first, normal operational mode the first target pitch angle α1 is determined by control system 36 according to wind speed, power curve and/or further environmental conditions. Said first target pitch angle α1 is communicated from control system 36 to pitch drive system 68 and thereby directly implemented by pitch drive system 68.

According to the exemplary embodiment, control system 36 switches from the first, normal operational mode into a second operational mode, if a measured temperature of a component, e.g. of an actuator of pitch drive system 68 exceeds the activation temperature threshold of 40° C. In this case control system 36 determines a second target pitch angle α2 by adding a pitch offset to the first target pitch angle α1. According to this exemplary embodiment, a pitch offset of 4° is added to the first target pitch angle α1 and thereby determining the second target pitch angle α2.

According to an exemplary embodiment, a Look-Up-Table (LUT) is provided in FIG. 3. The LUT can be provided with the control system 36. With the help of the LUT a first pitch offset is added, if the first activation temperature threshold of the actuator is exceeded, and a second offset value is added to the first target pitch angle α1, if a second activation temperature threshold of the actuator is exceeded. The first activation temperature threshold is higher than the second activation temperature threshold, wherein the second pitch offset is greater than the first pitch offset. According to the present embodiment, the pitch offset is set to 0.05°, if the measured temperature exceeds 40° C., to 0.1° if it exceeds 42° C., to 0.15° if it exceeds 44° C., to 0.5 if it exceeds 46° and to 1° if it exceeds 48° C.

According to one embodiment and independent from the given values for the activation temperature threshold the pitch offset is set to 0.05°, if the measured temperature exceeds a first activation temperature threshold, to 0.1° if it exceeds a second activation temperature threshold, to 0.15° if it exceeds a third activation temperature threshold, to 0.5° if it exceeds a fourth activation temperature threshold and to 1° if it exceeds a fifth activation temperature threshold.

Figure 4:
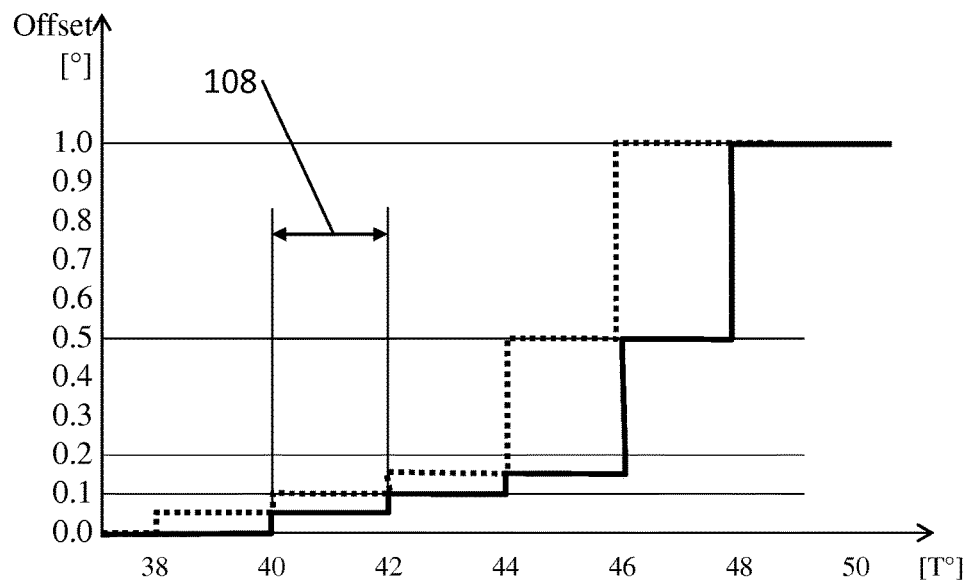
FIG. 4 shows the relation of the pitch offset and the temperature of a component of the pitch drive system according to FIG. 3.

In an additional aspect a deactivation temperature threshold can be defined, which is used to reduce the pitch offset in case the measured temperature of the actuator is falling or to switch from second operational mode back to first operational mode. That means that during a second operational mode the current pitch offset is cleared and replaced by a lower pitch offset or by no offset if the measured temperature of the actuator is below the so-called deactivation temperature threshold. The deactivation temperature threshold is lower than the corresponding activation temperature threshold in order to provide a switching strategy from higher to lower pitch offset values or back to the first, normal operational mode, which has characteristics of a hysteresis. By this it is omitted, that the control system 36 was switching between the first and second operational mode or from higher to lower pitch offset values back and forth in an elevated frequency. In FIG. 4 such switching strategy for adding or clearing of said values is presented, wherein the full line represents the process of adding the pitch offset if the measured temperature exceeds given activation temperature thresholds. The clearing of pitch offset values and the switching from the second to the first operational mode is shown with the help of the dotted line. It shall be noticed, that the first step—the introduction of pitch offset of 4° when the measured temperature exceeds the first activation temperature threshold of 40°—is the switching process from the first operational mode to the second operational mode of wind turbine 10.

The effect on the electrical performance of wind turbine 10 of the use of a pitch offset in order to modify the first target pitch angle α1 to what's the second target pitch angle α2—as described above—shall be explained with the help of FIG. 5. Two power curves 101, 102 of wind turbine 10 are presented in FIG. 5, wherein the left, full curve 101 stands for operating wind turbine 10 in first operational mode with no modifications of the first target pitch angle α1, which directly is implemented on the position of blade 22. The x-axis of said diagram displays the wind speed confronting wind turbine 10, wherein—according to this embodiments—at approximately 10.5 meter per second (m/s) the energy output of wind turbine 10 reaches the maximum, thus wind turbine 10 produces electrical energy at first rated power 103 and first rated wind speed 105. When wind turbine 10 is operated below said first rated wind speed 105 pitch drive system 68 is not required to adapt the position of blade 22 of wind turbine 10 since rotor 18 is rotating at variable speed and fluctuations of the wind speed are compensated by variations of the rotational speed of rotor 18. In case wind speed is higher as the upper mentioned, first rated wind speed 105—according to this exemplary embodiment, above 10.5 m/s—control system 36 would usually adjust the pitch angle of blade 22 according to the wind speed, in order to prevent wind turbine 10 to be operated above first rated power 103 and therefore protecting components of wind turbine 10 from being applied with an overload. That means control system 36 would adjust the pitch angle of blade 22 permanently to current wind conditions. Hence, pitch drive system 68 would be constantly active for compensating fluctuating wind speeds above first rated wind speed 105.

Figure 5:
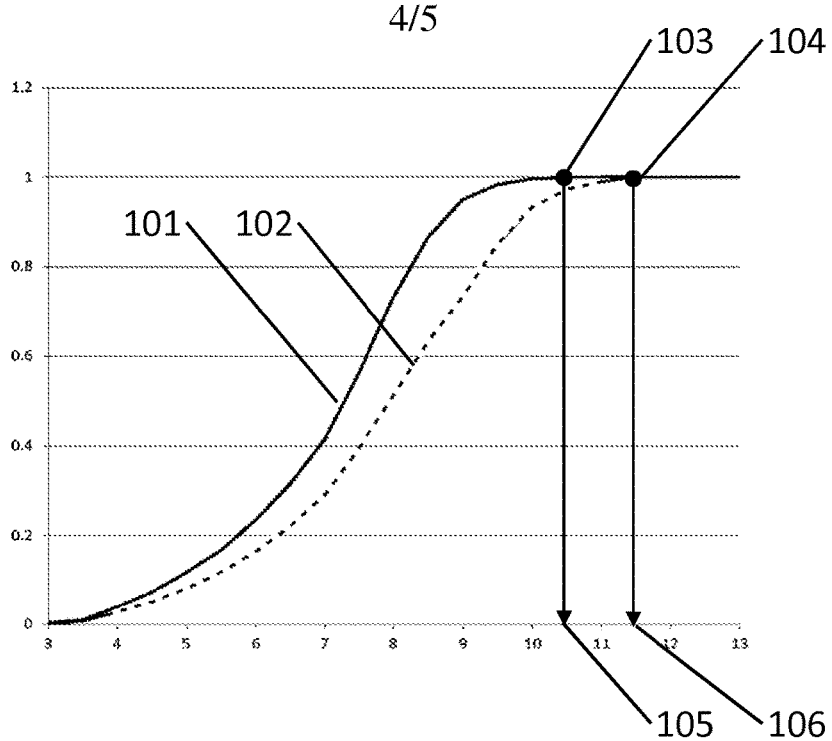
FIG. 5 shows the effect of the concept according to FIG. 3 on the power curve of the wind turbine.

The right, dotted power curve 102 in FIG. 5 shows wind turbine 10 being operated in the second operational mode, when applying the pitch offset to the first target pitch angle α1 and thereby determining a second target pitch angle α2. By this, blade 22 is generally turned away from the wind according to the pitch offset towards the fathered position, which results in a reduction of the efficiency of harvesting energy from the wind. By doing so, the wind speed corresponding to the rated power of wind turbine 10 is increased to a second rated wind speed 105. According to the present embodiment wind turbine 10 reaches a second rated power 104 for at approximately 11.5 m/s. In other words, when applying a pitch offset to the first target pitch angle α1 and therefore determining a second target pitch angle α2 the performance of wind turbine 10 shifts from first power curve 101 onto a second power curve 102. Thus, the operational area of wind turbine 10 without activation of pitch drive system 68 but variable speed of wind turbine 10 is increased towards the second rated wind speed 106.

In one embodiment the deactivation temperature threshold 108 is 1° C. less than the corresponding activation temperature threshold.

According to additional embodiments of a corresponding control strategy (not shown in FIG. 3) can be implemented, wherein values for the activation temperature threshold, the deactivation temperature threshold or for the pitch offset differ from the values provided in the exemplary embodiment shown in FIG. 3.

Alternatively or additionally to the use of a LUT, control system 36 can be provided with an algorithm for calculating the pitch offset corresponding to the measured temperature of the component, in especially of the actuator of pitch drive system 68.

According to an embodiment, the activation temperature threshold exceeds a predefined maximum measured temperature of a component of pitch drive system 68 by 10%, preferably by 5%, more preferably by 2.5% and most preferably by 1%. The earlier the wind turbine is operated in the second operational mode the more efficient is the protective effect on the component of pitch drive system 68 since elevated operational temperatures are effectively prevented.

According to an embodiment, wind turbine 10 is only operated in the second mode, if an electrical output of wind turbine 10 exceeds 50% of its rated electrical output. The effect of such additional restriction for switching from the first operational mode into second operational mode is to apply said measure for protecting components of pitch drive system 68 only when wind turbine 10 and its single components are facing an elevated load situation.

In accordance with an additional embodiment, induction generator 42 is connected to control system 36 in order to be used to influence a rotational speed of rotor 18. In especially, induction generator 42 is controlled such, that an electrical load of induction generator 42 is increased or reduced. By this, generator's momentum being effective on rotor 18 is reduced or increased accordingly.

According to a further embodiment, wind turbine 10 comprises more than one rotor blade, wherein the second target pitch angle α2 is applied to both blades 22. Advantageously, loads being applied on hub 20 by rotor blades 22 are equally balanced.

Figure 6:
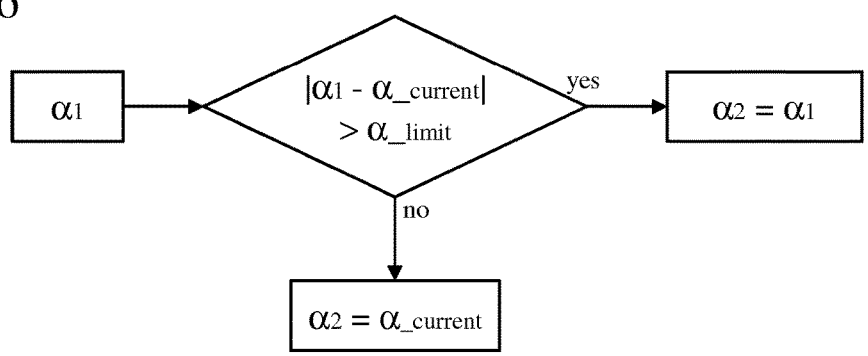
FIG. 6 shows an embodiment of operating a wind turbine in the second mode, wherein a coarsening value is added.

The embodiment according to FIG. 6 aims also on reducing the activity of pitch drive system 68, if the measured operational value of pitch drive system 68—in especially the actuator or motor—exceeds a predefined activation threshold. In such case wind turbine 10 is operated in the second operational mode, wherein during the second operational mode a second target pitch angle α2 is determined by adding a predefined deviation factor to the definition process of the first target pitch angle α1.

According to one embodiment wind turbine 10 is operated in the second operational mode when a temperature of the actuator of pitch drive system 68 exceeds an activation temperature threshold.

According to an embodiment, the activation temperature threshold exceeds a predefined maximum measured temperature of a component of pitch drive system 68 by 10%, preferably by 5%, more preferably by 2.5% and most preferably by 1%. The earlier the wind turbine is operated in the second operational mode the more efficient is the protective effect on the component of pitch drive system 68 since elevated operational temperatures are effectively prevented.

According to the embodiment shown in FIG. 6 the deviation factor is a coarsening value α_limit, which is used to prevent pitch system 68 to implement any change of the pitch angle as long as it does not exceed said coarsening value α_limit. In other words, pitch drive system 68 does not respond immediately and with accuracy as in first operational mode to a determined change of the pitch angle. In detail, a difference between the first target pitch angle α1 and the current pitch angle α_current of blade 22 is determined and subsequently compared with the coarsening value α_limit. If the absolute value of said difference is larger than the coarsening value α_limit, first target pitch angle α1 defined by control system 36 is set as second target pitch angle α2, which is then implemented to blade 22 with the help of pitch drive system 68. As long as the absolute value of the difference between the current pitch angle α_current and the first target pitch angle α1 is smaller than the coarsening value α_limit, second target pitch angle α2 is equated with the current pitch angle α_current of blade 22, which results in no pitch adjustment and no activity of pitch drive system 68.

According to an embodiment the coarsening value is larger than 0.1°, preferably larger than 0.07° more preferably larger than by 0.05°.

Figure 7:
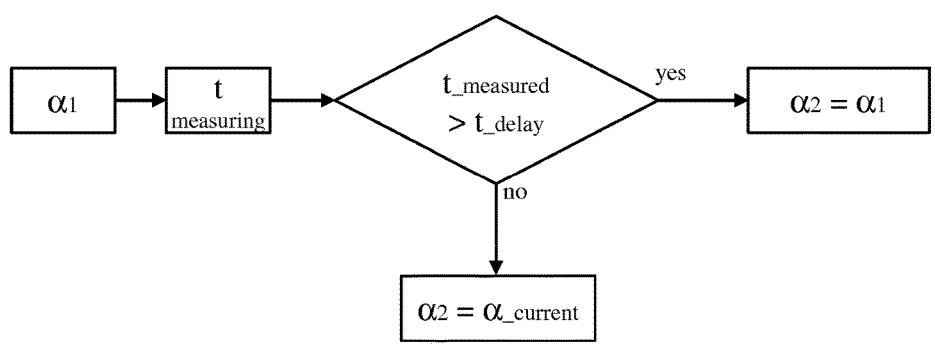
FIG. 7 provides an additional embodiment of operating a wind turbine in the second mode, wherein a predefined delay time is added to the process of determining a target pitch angle.
Figure 8:
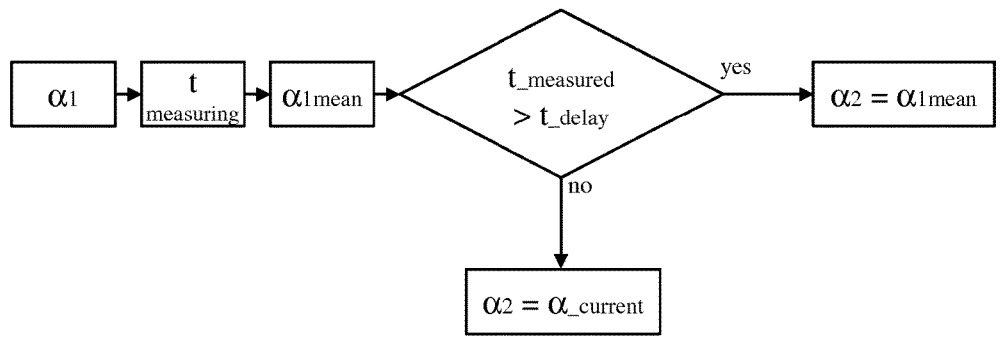
FIG. 8 describes a further embodiment of operating a wind turbine in the second mode, wherein the mean value for the target pitch angle is applied.

With the help of FIG. 7 and FIG. 8 two additional embodiments shall be disclosed, wherein the deviation factor is a predetermined delay time t_delay for slowing down the definition or implementation of the second target pitch angle α2. Such delay time t_delay is defined as a certain period, during which pitch drive system 68 is kept inactive by control system 36, even in such cases when the change in wind speed was requiring a change of the pitch angle of blade 22 of rotor 18. Hence, the time since the last activation of pitch drive system 68, in especially its actuator, is measured. When the measured time exceeds delay time t_delay the second target pitch angle α2 is equated with the first target pitch angle α1. Before delay time t_delay has passed second target pitch angle α2 is set to the current pitch angle α_current of blade 22 and therefore no change of the pitch angle of blade 22 is implemented.

According to the embodiment shown in FIG. 7, second target pitch angle α2 is set to first current pitch angle α1, which is determined by control system 36 according to the current situation or environmental conditions, like wind speed, etc.

According to an additional embodiment as shown in FIG. 8, first target pitch angle α1—for equally to second target pitch angle α2—is a mean target pitch angle α_mean calculated from a plurality of first target pitch angle α1 which have been determined by control system 36 during the delay time t_delay.

All of previously described measures to protect components of pitch drive system 68 by applying and deviation factor during second operational mode come with the effect, that compensation of fluctuations in wind speed is less accurate and said fluctuations may be reflected by corresponding variations of the rotational speed of rotor 18—in especially when operating above rated wind speed.

Therefore, and according to an additional embodiment, induction generator 42 can be controlled by control system 36 in order to influence the load being applied by induction generator 42 to the drive train of wind turbine 10. Such measure comes with the technical benefit that the rotational speed of rotor 18 can be controlled via induction generator 42 and fluctuations as mentioned above—and at least partly caused by the use of the deviation factor—can be compensated.

Exemplary embodiments of systems and methods for operating a wind turbine are described above in detail. The systems and methods are not limited to the specific embodiments described herein, but rather, components of the systems and/or steps of the methods may be utilized independently and separately from other components and/or steps described herein. For example, the method for operating a wind turbine is not limited to practice with only the wind turbine systems as described herein. Rather, the exemplary embodiment can be implemented and utilized in connection with many other rotor blade applications.

In especially it shall be mentioned, that according to an embodiment the method for operating a wind turbine can comprise at least partly the application of a pitch offset and of the delay time during second operational mode.

Although specific features of various embodiments of the invention may be shown in some drawings and not in others, this is for convenience only. In accordance with the principles of the invention, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. While various specific embodiments have been disclosed in the foregoing, those skilled in the art will recognize that the spirit and scope of the claims allows for equally effective modifications. Especially, mutually non-exclusive features of the embodiments described above may be combined with each other. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A method for operating a wind turbine, the wind turbine having a turbine rotor including a hub and at least one blade mounted to a rotatable turbine shaft, wherein the blade is rotatably arranged around its longitudinal axis at the hub, an induction generator having a stator and a rotor coupled to the turbine shaft for rotation therewith, a pitch drive system for adjusting a pitch angle of the blade, and a control system for defining a first target pitch angle and for continuously controlling the actuator accordingly, the method comprising:
   a) measuring a temperature of a component of the pitch drive system; and
   b) adjusting the pitch angle by using the pitch drive system according to the first target pitch angle, wherein the wind turbine being operated according to at least two operational modes,
      I. wherein during a first operational mode the first target pitch angle is determined at least according to a power curve of the wind turbine or to a measured wind speed,
      II. wherein during a second operational mode a second target pitch angle is determined by adding a pitch offset to the first target pitch angle, and
      III. wherein the second operational mode is activated when the measure temperature exceeds a predefined activation threshold.

2. The method according to claim 1, wherein
   a) the component is an actuator of the pitch drive system, and
   b) the activation threshold is an activation temperature threshold.

3. The method for operating a wind turbine according to claim 2, wherein the activation temperature threshold exceeds a predefined maximum temperature by 1%.

4. The method according to claim 2, wherein
   a) wherein a first pitch offset is added to the first target pitch angle, if a first activation temperature threshold of the component of the pitch drive system is exceeded,
   b) a second pitch offset is added to the first target pitch angle, if a second activation temperature threshold of the actuator is exceeded, c) wherein the first activation temperature threshold is higher than the second activation temperature threshold, and the second pitch offset is greater than the first pitch offset.

5. The method according to claim 4, wherein a plurality of activation temperature thresholds and corresponding pitch offsets are retrieved from a Look-Up-Table (LUT), and wherein the amount of each pitch offset increases with the increase of the related activation temperature thresholds.

6. The method according to claim 2, wherein the control system is provided with an algorithm for calculating a pitch offset corresponding to the measured temperature.

7. The method according to claim 2, wherein during the second operational mode a current pitch offset is cleared and replaced by a lower pitch offset or no pitch offset, if the measured temperature is below a deactivation temperature threshold corresponding to the current pitch offset, wherein the deactivation temperature threshold is lower than the corresponding activation temperature threshold.

8. The method according to claim 7, a deactivation temperature threshold is I degree Celsius less than the corresponding activation temperature threshold.

9. The method for operating a wind turbine according to claim 2, wherein the activation temperature threshold exceeds a predefined maximum temperature by 10%.

10. The method for operating a wind turbine according to claim 2, wherein the activation temperature threshold exceeds a predefined maximum temperature by 5%.

11. The method for operating a wind turbine according to claim 2, wherein the activation temperature threshold exceeds a predefined maximum temperature by 2.5%.

12. The method for operating a wind turbine according to claim 1, comprising during the second operational mode:

a) increasing or reducing an electrical load of the induction generator and thereby increasing or reducing generator's momentum being effective on the turbine rotor.

13. The method according to claim 1, wherein the wind turbine rotor comprises at least two blades, wherein the second target pitch angle is applied to each blade.

14. A wind turbine comprising:
a) a turbine rotor including a hub and at least one blade mounted to a rotatable turbine shaft, wherein the blade is rotatably arranged around its longitudinal axis at the hub,
b) an induction generator having a stator and a rotor coupled to the turbine shaft for rotation therewith,
c) a pitch drive system having an actuator for adjusting a pitch angle of the blade,
d) a control system for defining a first target pitch angle and for continuously controlling the actuator accordingly, and
e) a measuring device for measuring a temperature of a component the pitch drive system;
f) wherein the control system is configured to operate the wind turbine according to at least two operational modes,
  1. wherein during a first operational mode the first target pitch angle is determined at least according to a power curve of the wind turbine or to a measured wind speed,
  11. wherein during a second operational mode a second target pitch angle is determined by adding a pitch offset to the first target pitch angle, and,
  111. wherein the second operational mode is activated when the measured temperature exceeds a predefined activation threshold.

* * * * *